UNITED STATES PATENT OFFICE.

CARL DREHER, OF FREIBURG, GERMANY.

RESIN SOAP.

SPECIFICATION forming part of Letters Patent No. 634,448, dated October 10, 1899.

Application filed December 3, 1898. Serial No. 698,216. (No specimens.)

*To all whom it may concern:*

Be it known that I, CARL DREHER, a subject of the Emperor of Germany, residing at Freiburg, Baden, Germany, have invented certain new and useful Improvements in the Manufacture of Resin Soap, of which the following is a specification.

This invention relates to the manufacture or production of resin soap suitable for use in the manufacture of paper, for washing textile fabrics, and the like purposes.

It is well-known that resins, especially the cheaper kinds at present on the market, such as colophony, besides being used for the manufacture of lacquers and varnishes are largely employed for producing resin soap. Such soap is, however, only used in small quantities for washing textile fabrics as a substitute for fat or oil soaps, but is otherwise very extensively employed for sizing paper-pulp in the manufacture of paper. When used for the latter purpose, fir resin or colophony is dissolved by boiling with alkalies or alkaline carbonates, and the disintegrated paper-pulp is soaked with the solution in the cylinder-engine, whereupon the resin is precipitated upon the paper fiber by the addition of acids or salts of aluminium, such as alum or aluminium sulfate. Now experience has shown that the sizing of paper-pulp becomes more intimate and effective and also the use of resin soap for this purpose more economical in proportion as it contains a larger amount of free unsaponified resin—that is to say, the less alkali or alkaline carbonate is employed for the saponification of a given amount of resin. For many years endeavors have been made to reduce the quantity of alkali, the saponification being for this reason now effected by fourteen to sixteen parts of soda to one hundred parts of colophony, whereas formerly as much as twenty to twenty-five parts of soda were generally employed.

Resin soap is not intended to yield in water a clear solution, but a milky-white emulsion. The manufacture of such a resin soap, which contains free resin equally and very finely distributed in suspension in the water, however, becomes in general the more difficult, as free resin in a purer state is desired to be produced in this operation, seeing that it very easily occurs that large quantities of resin united by fusion are retained in the resinous glue or size and in the presence of water become instantly set free, by which the whole soap is rendered unfit for the sizing process. It is therefore necessary that an extremely intimate mixture of the resin with the alkali be effected, and for this purpose special distributing and mixing devices, stirring apparatus, pressure-boilers, and the like are used. In spite, however, of employing the most efficient apparatus the manufacture of a suitable resin soap remains at present one of the most difficult operations in the manufacture of paper, so that a general want is experienced in finding a thoroughly-reliable method of producing a resin soap rich in resin. Even with the most suitable apparatus—such as Arledter's pressure-boiler, with stirring apparatus, German Patent No. 97,823—and with every care and experience applied it is only possible to obtain a resin soap containing from twenty-five to thirty per cent. of unsaponified resin.

Now I have discovered that all resins can be dissolved with the greatest facility in phenol and its homologues and cresols—that is to say, when mixed with raw carbolic acid—and by partial saponification of the solutions by means of a small quantity of alkali resin soaps containing an extremely high percentage of resin can be obtained direct and without any special apparatus, which said soaps produce perfectly uniform emulsions in water and contain fifty per cent. of the used resin in an unsaponified form. It is thus possible to produce resin soaps with the theoretical minimum of alkali—that is to say, for instance, with 9.5 parts of carbonate of sodium—whereas it is a known fact that for obtaining total saponification, as for producing the neutral soda salt of resin soap, nineteen parts of carbonate of sodium are required. A proof as to how smoothly and evenly saponification of the resins in phenol solutions takes place is that solid ammonia soaps can be produced which under other circumstances are not obtainable at all.

For carrying out my invention the resin may be first dissolved in the phenols, adding subsequently the solution of alkali or alkaline carbonate. A neutral soap or one poor in free resin may, however, be first produced, this being an easy operation, and to this while in a liquid state may be added the carbolic solution of resin, or the resin-phenol solution may be added to the alkali solution.

The first method is the simplest, while the second may be employed for subsequently enriching at any time soaps poor in resin with free resin.

Example 1: One hundred parts, by weight, of disintegrated colophony are while being heated to about 100° centigrade dissolved in twenty parts of crude carbolic acid, the boiling-point of which is between 190° and 200° centigrade, and, while stirring, a solution of 9.5 parts of calcined carbonate of soda in twenty parts of water is added. The foaming ceases after heating for a short time and then the reaction is finished. The product treated with water at 60° to 70° centigrade immediately yields a satisfactory uniform emulsion.

Example 2: Instead of the above 9.5 parts of soda 12.5 parts of a soda-lye of 43° Baumé are employed.

Example 3: Instead of 9.5 parts of soda thirty-seven parts of concentrated ammonia (specific gravity 0.885) may be employed.

Example 4: A resin soap obtained from one hundred parts of resin and fifteen parts of soda is enriched by bringing into it a hot solution of twenty-five parts of resin in five parts of carbolic acid while stirring. Such a soap melts at about 100° centigrade and contains before enrichment about twenty-five per cent. of free resin. In fact, it is a soap for the manufacture of paper, which may be made in the ordinary way if an efficient saponifying process be employed. The mixture yields direct with water at from 60° to 70° centigrade a uniform milky emulsion.

Heretofore even by using the best known apparatus a boiling for hours was required to obtain a uniform saponification, whereas if the resin has been previously dissolved in carbolic acid saponification takes place quietly and in a few minutes at a temperature of from 80° to 100° centigrade. It is owing to the dissolving in carbolic acid that the product is most finely distributed and is consequently attacked by the alkali in the most uniform and rapid manner.

In the manufacture of paper this resin soap is so employed that in the cylinder-engine on the average from three to six grams of resin are used in one liter of water, this percentage corresponding to, at most, three-fifths to six-fifths grams of carbolic acid per liter of water. As the latter is soluble in water, the paper-pulp only absorbs or retains the resin, while the carbolic acid passes away with the waste water. The paper-pulp thus after having been drained has only traces of carbolic acid left in it, which when brought onto the hot drying-rollers become completely volatilized with the moisture, so that the finished paper is completely free from phenol and is therefore inodorous. As the phenols and their homologues have a perfectly neutral action upon coloring-matters, the paper is not in the least discolored by their presence. As, moreover, phenols are, as is known, completely incombustible, the danger of fire is not in the least increased, as would be the case if other organic solvents for the resins were employed, such as hydrocarbons, (benzol, petroleum or the like,) as have already been suggested for the same purpose, but which owing to their combustibility were found unsuitable. Furthermore, as the latter are not so soluble in water they remain in the paper and cause the same to become stained and to assume a disagreeable odor.

What I claim as my invention is—

1. The method of manufacturing resin soap, which consists in dissolving resin in phenol, or its homologues, and adding a solution of an alkali, substantially as described.

2. A soap containing resin, phenol and an alkali, substantially as described.

In witness whereof I have hereunto set my hand in presence of two witnesses.

CARL DREHER.

Witnesses:
B. THIEL,
HERMANN FICHTER.